United States Patent [19]

Asaoka et al.

[11] Patent Number: 4,555,394
[45] Date of Patent: Nov. 26, 1985

[54] PROCESS FOR THE PREPARATION OF ALUMINA

[75] Inventors: Sachio Asaoka, Yokohama; Takashi Sendo, Machida, both of Japan

[73] Assignee: Chiyoda Chemical Engineering & Construction Co., Ltd., Yokohama, Japan

[21] Appl. No.: 616,353

[22] Filed: Jun. 1, 1984

[51] Int. Cl.$^4$ .............................. C01F 7/02; C01F 7/34
[52] U.S. Cl. ..................................... 423/626; 423/628; 423/629; 423/630; 423/631
[58] Field of Search ........................ 423/628, 629, 626

[56] References Cited

U.S. PATENT DOCUMENTS

| 3,649,184 | 3/1972 | Featherston | 423/629 |
| 4,313,923 | 2/1982 | Block et al. | 423/628 |
| 4,364,919 | 12/1982 | Yamada et al. | 423/629 |
| 4,371,513 | 2/1983 | Sanchez et al. | 423/628 |

OTHER PUBLICATIONS

Brace et al, Aluminum Hydrous Oxide Sols–I, Journal of Inorganic and Nuclear Chemistry, vol. 35, p. 3691, (1973).

Primary Examiner—Herbert T. Carter
Attorney, Agent, or Firm—Armstrong, Nikaido, Marmelstein & Kubovcik

[57] ABSTRACT

An improved process for the preparation of alumina, including forming an alumina hydrogel from aluminum hydroxide, and processing the alumina hydrogel into alumina. The improvement involves the alumina hydrogel forming step which is connected in the presence of sulfate ion and which comprises providing, in a reaction zone, an aqueous slurry containing seed aluminum hydroxide and having a pH of 6–11, and feeding to the reaction zone an aluminum compound and a pH controlling agent for mixing with the aqueous slurry while maintaining the aqueous slurry at a temperature of at least about 50° C. at feed rates so that the pH of the aqueous slurry is maintained within the range of 6–11 and that 0.2–5 mols/hour of aluminum components, in terms of elemental aluminum, are fed to the reaction zone per mole of the seed aluminum hydroxide originally contained in the aqueous slurry, whereby the seed aluminum hydroxide is caused to grow to the aluminum hydrogel.

10 Claims, No Drawings

PROCESS FOR THE PREPARATION OF ALUMINA

BACKGROUND OF THE INVENTION

This invention relates generally to a process for the preparation of alumina. More specifically, the present invention is concerned with a process for the preparation of alumina having desirable pore diameter and surface area suitable for use as a catalyst carrier.

Alumina is widely used as a catalyst carrier because of its higher mechanical strength and larger surface area as compared with other inorganic oxides, a large surface area being long considered to be advantageous since the reactivity of a catalyst depends on its surface area. In recent years, however, the pore diameter and pore distribution of a catalyst carrier have been recognized as being also of importance. In fact, the pore diameter and the pore volume of a catalyst have a greater influence on the catalytic reaction than the surface area when the molecular size of the reactant has an effect on the catalytic reaction. In addition, the mechanical strength of a catalyst generally depends upon its pore diameter and pore volume. Therefore, many attempts have been made to provide an effective method which can control the pore distribution of alumina and which can produce an alumina carrier having an improved mechanical strength.

In many catalytic reactions, the pore diameter of the catalyst has an important effect on the catalytic activity and selectivity. The smaller the pore diameter, the lower becomes the rate of diffusion of the reactant molecules into the catalyst pores, resulting in a decrease of the catalytic effectiveness factor and, thus, the catalytic activity. When the pore diameter is increased, the catalytic effectiveness factor is also increased, but the increase of the effectiveness factor stops after the pore diameter reaches a certain value. When the pore diameter is increased beyond the specific value, the apparent catalytic activity is decreased as a result of a decrease in the surface area. If the pore diameter is increased while maintaining the surface area within a certain level, then the pore volume becomes so large that the mechanical strength of the catalyst is considerably deteriorated. Therefore, in order to provide a catalyst exhibiting excellent catalytic activity, it is necessary to provide a catalyst carrier which has both an optimum pore diameter and large surface area while controlling the pore volume to a value so that the deterioration of the mechanical strength is prevented.

Among many types of alumina, $\gamma$-alumina is known to have a high thermal stability and a high mechanical strength. It is also known that $\gamma$-alumina can be produced by calcining boehmite gel and that $\gamma$-alumina can be converted into alumina of other crystalline forms such as $\alpha$-alumina. Boehmite gel is a hydrated gel of fibrous boehmite crystallites, generally called "pseudo-boehmite". The boehmite gel can be generally produced by aging non-crystalline aluminum hydroxide at a temperature of at least 50° C. and a pH of 6–11. To produce alumina carriers (not only $\gamma$-alumina but also other forms of alumina) having suitably controlled pore diameter distribution and pore volume, the crystal size of the pseudo-boehmite must be adjusted to a suitable size. When the pseudo-boehmite has an excessively large crystal size, the resultant alumina formed by calcination of the pseudo-boehmite will have a large pore diameter. On the other hand, when the pseudo-boehmite has an excessively small crystal size, the resulting alumina will have a small pore diameter and, further, the pore volume will be reduced as a result of the excessive sintering of the crystallites during calcination. Furthermore, if the pseudo-boehmite crystallites do not have uniform sizes, the resultant alumina obtained by calcination will have non-uniform crystal sizes so that the pore diameter will be also non-uniform and the pore volume will become very small. Additionally, when the boehmite gel contains a large amount of non-fibrous fine crystals or amorphous components, the gel will densely agglomerate and the alumina product obtained therefrom by calcination will have a small pore volume. Therefore, in order to obtain alumina carriers having desirably controlled pore diameter distribution and pore volume, it is necessary to prepare a boehmite hydrogel containing alumina crystallites of a uniform and suitable size.

Conventionally, the control of the pore diameter and pore volume of a catalyst carrier has resorted to a method in which the particle size of each of the primary particles constituting the carrier and the packing of the primary particles are controlled so as to control the size and the volume of the space defined between the primary particles. However, from the standpoint of mechanical strength, the manner of packing cannot be freely varied but is limited according to the particle size. In other words, the pore diameter cannot be varied independent of the pore volume. This also applies to alumina carriers. Thus, though the pore diameter can be increased by increasing the particle size of the primary particles, the pore volume cannot be increased and the specific surface area is reduced thereby.

Various methods have thus far been proposed for preparing alumina, especially $\gamma$-alumina, having a large pore volume and a large pore diameter while maintaining the specific surface area at a high level. One such method includes controlling the shrinkage of the gel structure during drying and calcining of boehmite hydrogel. Since, according to this method, the specific surface area is maintained unchanged, the control of the pore volume can be made by the control of the pore diameter. An example of the above method is disclosed in *Journal of Polymer Science*, Vol. 34, p. 129, in which the drying speed of the boehmite hydrogel is controlled. This method, however, suffers from a drawback because the control of the pore volume must be limited to a very narrow range in order to maintain the mechanical strength of the alumina product in an appropriate range. Some methods are proposed which are capable of controlling the pore volume in a wide range, such as (1) a method in which a water-soluble polymeric material such as a polyethylene glycol is added to the boehmite hydrogel (Japanese Published Unexamined Patent Applications Nos. 52-104498 & 52-77891); and (2) a method in which an alcohol is substituted for a part of, or a greater part of, the water in the boehmite hydrogel (Japanese Published Unexamined Patent Application No. 52-123588). In both methods, the pore volume is controlled by use of an amount of the water-soluble polymeric material (in the former case) or the alcohol (in the latter case) which may inhibit the dense aggregation of the boehmite crystallites that would occur during the drying step as a result of the surface tension of the water contained in the gel. The alumina carrier obtained by these methods, however, fails to exhibit satisfactory mechanical strength and stability to water because the binding forces between boehmite crystallites are weak due to the deterioration of the surface tension of water.

Japanese Examined Patent Publication No. 49-37517 proposes a method in which a part of the boehmite gel is first changed to xerogel and the xerogel is then incorporated into a hydrogel of boehmite to increase the pore volume. The alumina thus obtained has a so-called "double-peak" pore distribution having small pores defined between boehmite fine crystallites and large pores defined between the xerogels. Therefore, this method cannot produce an alumina carrier having a large pore volume in pores having a desirable pore diameter and a large surface area.

In order to control the particle size of the primary particles forming an alumina carrier, it is necessary to control the particle size of the primary particles forming the boehmite hydrogel which is a precursor material for the carrier. As described previously, the conventional method of preparing a boehmite hydrogel includes aging seed aluminum hydroxide at a pH of 6-11 which range is suited for the formation of boehmite. However, in such a pH range, the rate of dissolution of fine crystallites is extremely low so that the so-called Ostwald's rate (rate at which crystals grow with accompanying dissolution of fine crystallites) becomes very low. Therefore, the conventional method requires a long period of time for the growth of boehmite particles.

U.S. Pat. No. 4,248,852 discloses a method for the preparation of an alumina carrier, especially γ-alumina, having a large surface area and a controlled pore volume. This method includes alternately adding to a slurry containing aluminum hydroxide which serves as seed crystals, while maintaining the temperature of the slurry at 50° C. or more, an aluminum compound and a neutralizing agent with stirring so as to form active aluminum hydroxide which is occluded into the seed aluminum hydroxide, thereby to accelerate the growth of the crystals. The thus grown boehmite particles combine with each other to form a sparse aggregate. By controlling the state of the aggregate, the shrinkage of boehmite gel during drying can be prevented and an alumina carrier having a controlled pore characteristics and a large surface area can be obtained. This method, however, has a problem in practice because the operation of the process is complicated.

SUMMARY OF THE INVENTION

With the foregoing situation in view, the present invention has as its prime object the provision of a simple process by which an alumina carrier having a high mechanical strength and a large pore volume in pores of a desired diameter can be easily obtained.

The present invention provides an improved process for the preparation of alumina, including the steps of forming an alumina hydrogel from aluminum hydroxide, and processing the hydrogel for conversion into alumina. The improvement involves the alumina hydrogel forming step which is performed in the presence of sulfate ion and which comprises providing, in a reaction zone, an aqueous slurry containing seed aluminum hydroxide and having a pH of 6-11, and feeding an aluminum compound and a pH controlling agent to the reaction zone for mixing with the aqueous slurry, while maintaining the squeous slurry at a temperature of at least about 50° C., at feed rates so that the pH of the aqueous slurry is maintained within the range of 6-11 and that 0.2-5 mols/hour of aluminum components, in terms of elemental aluminum, are fed to the reaction zone per mol ofthe aluminum hydroxide originally contained in the aqueous slurry whereby the seed aluminum hydroxide is caused to grow to the alumina hydrogel.

The feature of the present invention resides in the specified feed rates of the aluminum compound and the pH controlling agent. When the aluminum compound and the pH controlling agent are added to the aqueous slurry, the aluminum compound is converted into active aluminum hydroxide having a high reactivity. In the presence of the seed aluminum hydroxide, the thus formed active aluminum hydroxide is occluded thereinto to effect the growth thereof. However, when the active aluminum hydroxide exists in a large amount, a part of the active aluminum hydroxide tends to form, without being occluded into the seed aluminum hydroxide originally present in the slurry, new seed aluminum hydroxide by coalescence of the excess active aluminum hydroxide, similar to the generation of secondary crystal nuclei in crystal growth. As a consequence of the formation of the new seed aluminum hydroxide, the resultant boehmite slurry contains boehmite of various sizes, rendering it difficult to control the pore structure of the alumina carrier produced therefrom. It has been found that when the feed rates of the aluminum compound and the pH controlling agent is controlled so that the feed rate of their aluminum components does not exceed 500 molar % per hour, in terms of elemental metal, based on the seed aluminum hydroxide originally present in the slurry, the seed aluminum hydroxide can grow to boehmite hydrogel without involving the above problem. On the other hand, when the feed rate of the aluminum compound and the pH controlling agent is insufficient to provide at least 20% molar per hour of aluminum components, in terms of elemental aluminum, based on the seed aluminum hydroxide, the growth of the seed aluminum hydroxide requires a considerably long time and is disadvantageous from an economic point of view.

Another feature of the present invention is that the alumina hydrogel forming step is conducted in the presence of sulfate ion. The advantages accruing from performing the alumina hydrogel forming step in the presence of sulfate ion are as follows. Firstly, sulfate ion can prevent the coalescence of the active aluminum hydroxide. Even if the relative amount of the active aluminum hydroxide to the seed aluminum hydroxide is maintained at a proper range, coalescence of the active aluminum hydroxide will take place unless the active aluminum hydroxide is swiftly occluded into the seed aluminum hydroxide. Since sulfate ion is easily adsorbed on the surface of the seed aluminum hydroxide and since the sulfate ion thus adsorbed serves to accelerate the occlusion of the active aluminum hydroxide into the seed aluminum hydroxide, the occurrence of the coalescence of the active aluminum hydroxide may be minimized when the alumina hydrogel forming step is performed in the presence of sulfate. Secondly, the growth of the alumina hydrogel proceeds faster in the presence of sulfate ion than that in the presence of other ion such as halide ion and nitrate ion. Thirdly, the sulfate ion is easily removed from the alumina hydrogel. Whilst the formation of precipitates proceeds much faster in the presence of phosphate ion as compared with sulfate ion, the rate of the precipitation is so fast that the boehmite crystallites hardly form in the presence of phosphate ion. Further, it is very difficult to remove the phosphate ion from the precipitates. Such precipitates containing phosphate ion cannot give alumina having a large pore volume and a large surface area. In contrast, the sulfate ion in the alumina hydrogel prepared in accordance with the process of the present invention may be easily removed therefrom by, for example, washing and filtration, enabling to produce alumina having both a large pore volume and a large surface area. Fourthly, sulfate ion serves to accelerate the formation of a stable aggregate of grown boehmite particles with the active aluminum hydroxide acting as a binding agent. The aggregate is not destroyed when subjected to subsequent treatments for the conversion into an alumina carrier. As a result the alumina carrier may have a high mechanical strength, a large pore volume and a large surface area.

The present invention is also characterized in that the alumina hydrogel forming step is performed at a pH of 6–11. In an alumina hydrogel forming system containing sulfate ion, there is established, at a pH of below 6, a condition wherein amorphous aluminum hydrate is precipitated. In the pH region of above 11, on the other hand, there is established a condition in which bayerite crystals are formed. Since the alumina hydrogel forming step of the present invention is carried out at a pH of 6–11, there is little possibility that the alumina hydrogel be contaminated with other crystallites than boehmite. For the above reason, it is preferred that the aluminum compound and the pH controlling agent be added continuously and simultaneously into the seed aluminum hydroxide-containing slurry with stirring. The maintenance of the pH within the range of 6–11 has an additional merit in that the rate of growth of boehmite crystals is faster as compared with the case in which the pH is alternately swung between the region of below 5 and the region of above 11, because at a pH within the range of 6–11 no dissolution of boehmite crystallites occurs.

Other objects, features and advantages of the present invention will become apparent from the detailed description of the invention to follow.

DETAILED DESCRIPTION OF THE INVENTION

The aluminum hydroxide contained in the aqueous slurry which is used as the starting material in the process of the present invention serves as a seed for the formation of boehmite hydrogel. The aqueous slurry may be produced by any conventional methods used in this field. For example, the seed aluminum hydroxide may be produced by (1) adding an alkali to an aqueous solution of an aluminum salt of a strong acid such as aluminum nitrate, aluminum chloride or aluminum sulfate at a pH of 6–11, and (2) adding an acid or the above aluminum salt to an aqueous solution of sodium aluminate, potassium aluminate or the like aluminate at a pH of 6–11.

As described hereinafter, the aluminum compound and the pH controlling agent which are added to the slurry for the formation of alumina hydrogel can be the same substances as used in the slurry forming step. Therefore, the formation of the seed aluminum hydroxide and the growth thereof to the alumina hydrogel may be continuously performed in accordance with the process of the present invention without a need of separation, washing and other operations after the formation of the seed aluminum hydroxide.

The seed aluminum hydroxide prepared by the above-described neutralization reaction is found to have a fibrous form having a length of 100 Å and a diameter of 10–20 Å by a microscopic examination. The fibrous material is considered to have a boehmite structure. However, because of its smallness in particle size, an X-ray diffraction analysis indicates that the fibrous material is amorphous. Such seed aluminum hydroxide, when calcined at a temperature of 400° C., gives amorphous alumina having a pore volume of as small as 0.4 cc/g. Even when such a seed aluminum hydroxide-containing slurry is allowed to stand at a temperature of 50° C. and a pH of 6–11 for over 24 hours, no crystal growth takes place and the alumina produced from the aged seed aluminum hydroxide has a pore volume of as small as 0.4 cc/g.

According to the present invention, the slurry having a pH of 6–11 is provided in a reaction zone, to which are added the aluminum compound and the pH controlling agent while maintaining the pH and the temperature at 6–11 and at least about 50° C., respectively, for the growth of the seed aluminum hydroxide and for the formation of an alumina hydrogel. When the hydrogel forming step is performed at a low temperature, the pore volume of γ-alumina derived from the resultant alumina hydrogel becomes distributed in a broad range of pore diameters. Under a pressurized condition, the hydrogel forming step may be carried out at a temperature of 100° C. or more. In this case, too, the pore volume distribution tends to slightly broaden. Generally, however, the influence of the temperature on pore distribution of the alumina product does not cause any essential problems so long as the alumina hydrogel forming step is performed at least about 50° C. Preferably, the hydrogel forming step is carried out at a temperature of above 70° C. but below the boiling point of the slurry.

Any water-soluble aluminum salt or aluminate is suitably used as the aluminum compound. Examples of the aluminum salts include aluminum sulfate, aluminum chloride and aluminum nitrate. Examples of the aluminates include sodium aluminate and potassium aluminate. When aluminum sulfate is used as the aluminum compound, an alkaline substance such as sodium aluminate, potassium aluminate, ammonia, sodium hydroxide or potassium hydroxide is used as the pH controlling agent. Such an alkaline substance is also used in combination with aluminum salts other than aluminum sulfate. In such a case, the aluminum salts are generally used together with sulfuric acid. When an aluminate is used as the aluminum compound, sulfuric acid is suitably used as the pH controlling agent. Illustrative of suitable combinations of the aluminum compound and the pH controlling agent are aluminum sulfate-sodium aluminate, sodium aluminate-sulfuric acid and aluminum sulfate-sodium hydroxide. Above all, the combination of aluminum sulfate and sodium aluminate is especially preferred since the combination can minimize the local increase or decrease of the pH of the aqueous slurry out of the pH range of 6–11 during the alumina hydrogel forming step. It is essential that the reaction system contain sulfate ion. The amount of the sulfate ion is preferably 0.12–3 mols, more preferably 0.2–1 mol per mol of the total aluminum components contained in the reaction system in terms of elemental aluminum, throughout the growth of the seed aluminum hydroxide. Sulfate ion may be provided in the reaction system in various manners. The seed aluminum hydroxide-containing slurry can contain the necessary amount of sulfate ion so that the alumina hydrogel forming step may be performed in the presence of sulfate ion. When the aluminum compound and/or the pH controlling agent are of a type which is capable of providing sulfate ion, such as sulfuric acid or aluminum sulfate, the alumina hydrogel forming step can be performed in the presence of sulfate ion. The use of a combination of an aluminum salt, such as aluminum chloride, and sulfuric acid can also provide the reaction system with sulfate ion.

As described previously, the feed rates of the aluminum compound and the pH controlling agent should be controlled so that aluminum components are hourly supplied to the reaction zone in an amount of 0.2–5 mols, in terms of elemental aluminum, per mol of the seed aluminum hydroxide originally contained in the aqueous slurry, the aluminum components being derived not only from the aluminum compound but also from the pH controlling agent if it contains aluminum.

When the feed rates of the aluminum compound and the pH controlling agent are too low to provide the 0.2 mol/hour lower limit, the growth of the seed aluminum hydroxide fails to proceed at a desirable high velocity and, moreover, the selective growth of fine particles of seed aluminum hydroxide cannot occur. In general, the smaller the particle size of seed aluminum hydroxide, the higher is the rate at which the seed aluminum hydroxide grows. Therefore, even when both fine and relatively large particles of seed aluminum hydroxide coexist, the particle size of the resultant hydrogel becomes uniform if active aluminum hydroxide is present in a proper amount.

On the other hand, too high a feed rate of aluminum components resulting from the addition of the aluminum compound and the pH controlling agent causes the formation of new seed aluminum hydroxide by coalescence of excess active aluminum hydroxide, which in turn results in the non-uniformity of particle size of the resultant boehmite gel. Since the ability of seed aluminum hydroxide to occlude active aluminum hydroxide is high at the initial stage of the hydrogel forming step, new seed aluminum hydroxide will not form even when the initial feed rate is the maximum (5 mols). However, such an ability becomes lowered with the growth of boehmite gel particles. Therefore, it is desired to lower the feed rates of aluminum components after boehmite gel particles grow to a certain degree so that the formation of new seed aluminum hydroxide is prevented.

The total amount of the aluminum components to be added to the seed aluminum hydroxide-containing slurry by the supply of the aluminum compound and the pH controlling agent may vary depending upon the intended pore volume and pore diameter of the alumina carrier to be prepared. For example, in order for seed aluminum hydroxide having a particle size of 10–20 Å to grow, by occlusion of active aluminum hydroxide, to boehmite gel particles having a particle size of 30–40 Å, the feed rate of aluminum components should be at least several times the amount of the seed aluminum hydroxide. Preferably, the total amount of the aluminum components is at least a value so that the formation of boehmite crystallites may be clearly observed by an X-ray diffraction analysis. Generally, the total amount is about 3–30 times the amount, in terms of alumina, of the seed aluminum hydroxide.

The aluminum compound and the pH controlling agent are preferably added to the slurry each in the form of an aqueous solution. The concentrations of the aluminum compound and of the pH controlling agent in respective solutions are not critical. However, too high concentrations are undesirable because the pH control becomes difficult to perform smoothly. Too low concentrations are also undesirable because the rate of the growth of boehmite gel becomes slow. Further, the concentration of the solid materials in the reaction mixture within the reactor is desirably controlled throughout the hydrogel forming step, so that the agitation may be effected thoroughly without the local occurrence of high or low concentrations of active aluminum hydroxide or the local occurence of an increase or decrease in pH of the reaction mixture. Therefore, it is advisable to adjust the concentrations of the starting aqueous slurry and the solutions of the aluminum compound and the pH controlling agent so that the reaction mixture can be agitated uniformly and completely throughout the hydrogel forming stage. When the concentration of solid material in the reaction mixture is below about 5 weight % in terms of $Al_2O_3$, agitation with a rotary blade-type agitator may be satisfactorily performed.

The resultant slurry containing boehmite hydrogel particles which have thus grown and aggregated are then processed to obtain alumina in any known manner, for example, in the following manner: The hydrogel is filtered to obtain a filter cake. After the filter cake is washed with water to remove sulfate ion, sodium ion, etc.; the filter cake is dehydrated to adjust its solids content for the subsequent molding operation. The solids content, for the purpose of extrusion molding, is generally adjusted to 20–35%. The cake of which the water content has thus been adjusted is molded into any desired shape by way of, for example, extrusion, oil dropping and wet granulation method. A spray dry method may also be adopted for the formation of a powdery alumina carrier. The extrudates or other shaped boehmite thus obtained are then dried, generally at a temperature of 100°–200° C., and calcined to obtain alumina. If γ-alumina is intended, the calcination is generally performed at a temperature of 400°–700° C.

The following examples will further illustrate the present invention.

Comparative Example 1

0.224 Liter of an aqueous solution of aluminum sulfate (concentration: 80 g/l in terms of $Al_2O_3$) and 10 liters of deionized water were placed in an enamel-coated vessel and heated to 90° C. Then, 1.5 liters of an aqueous solution of sodium aluminate (concentration: 69 g/l in terms of $Al_2O_3$) were poured into the vessel all at once, with vigorous agitation, to form a slurry having a pH of 10. A portion of the slurry was aged at 90° C. for 3 hours and the remainder portion was for 6 hours. Each of the aged slurries was filtered and washed with deionized water to remove a greater part of the sulfate ion and sodium ion contained therein. The each of the resultant cakes was extruded to obtain an extrudate having a diameter of 1.6 mm. Each extrudate was dried at 120° C. for 6 hours and calcined for three hours to form Alumina Sample $R_1$ (aged for 3 hours) and Alumina Sample $R_2$ (aged for 6 hours), the physical properties of which are shown in Table 1.

Comparative Example 2

0.10 Liter of an aqueous solution of aluminum nitrate (concentration: 40 g/l in terms of $Al_2O_3$) and 10 liters of a deionized water were placed in an enamel-coated vessel and heated to 90° C. Then 0.35 liter of an aqueous solution of sodium aluminate (concentration: 69 g/l in terms of $Al_2O_3$) was poured into the vessel all at once, with vigorous agitation, to form an aluminum hydroxide-containing slurry having a pH of 9.5. Then an aqueous solution of aluminum nitrate (concentration: 8 g/l in terms of $Al_2O_3$) and an aqueous solution of sodium aluminate (concentration: 69 g/l in terms of $Al_2O_3$) were continuously fed to the reactor at constant rates of 0.29 l/hour and 0.20 l/hour, respectively, from separate feed ports for mixing with the aluminum hydroxide in the reactor, which served as a seed, while maintaining the temperature at 90° C. During the addition of the solutions, the pH of the mixture in the reactor was found to be maintained within the range of 9–10. A portion of the reaction mixture was sampled after 3 hours from the commencement of the feed of the two aqueous solutions. Another portion of the reaction mixture was also sampled 3 hours after the first sampling. Each sample was filtered and washed with deionized water to obtain a cake which was subsequently extruded through a die, whereby an extrudate having a diameter of 1.6 mm was obtained. Each extrudate was dried and calcined in the same manner as described in Comparative Example 1 to obtain Alumina Sample $R_3$ (Feed of the solutions continued for 3 hours) and Alumina Sample $R_4$ (Feed of the solutions continued for 6 hours) whose physical properties are summarized in Table 1.

EXAMPLE 1

0.05 Liter of an aqueous solution of aluminum sulfate (concentration: 80 g/l in terms of $Al_2O_3$) and 10 liters of deionized water were placed in an enamel-coated vessel and heated to 90° C. Then, 0.35 liter of an aqueous solution of sodium aluminate (concentration: 69 g/l in terms of $Al_2O_3$) was poured into the vessel all at once, with vigorous agitation, to form an aluminum hydroxide-containing slurry having a pH of 10. Then an aqueous solution of aluminum sulfate (concentration: 8 g/l in terms of $Al_2O_3$) and an aqueous solution of sodium aluminate (concentration: 69 g/l in terms of $Al_2O_3$) were continuously fed to the reactor at constant rates of 0.29 l/hour and 0.20 l/hour, respectively, from separate feed ports for mixing with the aluminum hydroxide in the reactor, which served as a seed, while maintaining the temperature at 90° C. During the addition of the solutions, the pH of the mixture in the reactor was found to be maintained within the range of 9–10. 0.3 Liter of the reaction mixture was sampled after 3 hours from the commencement of the feed of the two aqueous solutions. Further three portions of the reaction mixture, each in an amount of 0.3 liter, were also sampled hourly after the first sampling. Each sample was filtered and dispersed into 2 liters of deionized water and again filtered. Such dispersion and filtration operation was repeated thrice in total to obtain a cake which was subsequently extruded through a die, whereby an extrudate having a diameter of 1.6 mm was obtained. The resultant 4 types of extrudates were dried and calcined in the same manner as described in Comparative Example 1, whereby obtaining Alumina Samples A–D (Feed of the solutions continued for 3, 4, 5 and 6 hours, respectively) whose physical properties are summarized in Table 1.

TABLE 1

|  | $R_1$ | $R_2$ | $R_3$ | $R_4$ | A | B | C | D |
|---|---|---|---|---|---|---|---|---|
| Specific surface area ($m^2/g$) | 162 | 159 | 203 | 146 | 234 | 205 | 185 | 173 |
| Pore volume (cc/g) | | | | | | | | |
| 75–100 Å | 0.30 | 0.29 | 0.06 | 0.03 | 0.07 | 0.05 | 0.04 | 0.05 |
| 100–200 Å | 0.02 | 0.02 | 0.30 | 0.19 | 0.28 | 0.25 | 0.19 | 0.17 |
| 200–400 Å | 0.00 | 0.00 | 0.38 | 0.27 | 0.63 | 0.75 | 0.56 | 0.39 |
| 400 Å – | 0.00 | 0.00 | 0.51 | 1.32 | 0.03 | 0.04 | 0.34 | 0.65 |
| Total | 0.32 | 0.31 | 1.26 | 1.81 | 1.01 | 1.09 | 1.13 | 1.26 |
| Average pore diameter (Å) | 79 | 78 | 248 | 499 | 180 | 212 | 244 | 292 |
| Pellet diameter (mm) | 1.0 | 1.0 | 1.4 | 1.4 | 1.1 | 1.1 | 1.3 | 1.3 |
| Side crushing strength (Kg) | 2.5 | 2.6 | 1.0 | 0.9 | 2.9 | 2.8 | 2.6 | 2.3 |

From the results shown in Table 1, it will be noted that Samples $R_1$ and $R_2$ have a very small pore volume. Though Samples $R_3$ and $R_4$ have a large pore volume, the pore volume is distributed in pores having broad range of pore diameters. Further, Samples $R_3$ and $R_4$ have their large pore volume in pores of a diameter of above 400 Å, in which pores the surface area is small. Additionally, Samples $R_3$ and $R_4$ are low in mechanical strength. In contrast, Samples A–D prepared in accordance with the process of the present invention have a remarkably high mechanical strength and a large pore volume. The average pore diameter increases in the order from A to D, i.e. with the increase of the hydrogel forming reaction time. The pore volume of any of Samples A–D is concentrated in pores having a diameter of 200–400 Å.

EXAMPLE 2

0.1 Liter of an aqueous solution of aluminum nitrate (concentration: 40 g/l in terms of $Al_2O_3$) and 10 liters of deionized water were placed in an enamel-coated vessel and heated to 90° C. Then, 0.35 liter of an aqueous solution of sodium aluminate (concentration: 69 g/l in terms of $Al_2O_3$) was poured into the vessel all at once, with vigorous agitation, to form an aluminum hydroxide-containing slurry having a pH of 9.5. The thus obtained slurry was then subjected to an alumina hydrogel-forming treatment in the same manner as described in Example 1. Two portions of the reaction mixture were sampled 3 and 6 hours after the commencement of the treatment, respectively. Each sample was then processed in the same manner as described in Example 1 to obtain Alumina Samples E and F (Feed of the solutions continued for 3 and 6 hours, respectively) whose physical properties were as shown in Table 2.

TABLE 2

|  | E | F |
|---|---|---|
| Specific surface area ($m^2/g$) | 235 | 161 |
| Pore volume (cc/g) | | |
| 75–100 Å | 0.23 | 0.03 |
| 100–200 Å | 0.35 | 0.15 |
| 200–400 Å | 0.02 | 0.54 |
| 400 Å – | 0.01 | 0.34 |
| Total | 0.60 | 1.06 |
| Average pore diameter (Å) | 101 | 265 |
| Pellet diameter (mm) | 1.1 | 1.2 |
| Side crushing strength (Kg) | 2.8 | 2.5 |

EXAMPLE 3

To the same aqueous solution containing seed aluminum hydroxide as used in Example 1 were added an aqueous solution of aluminum sulfate (First Solution, Concentration: 8 g/l in terms of $Al_2O_3$) and an aqueous solution of sodium aluminate (Second Solution, Concentration: 69 g/l in terms of $Al_2O_3$) at various feed rates indicated in Table 3 for 3 hours while maintaining the temperature at 90° C. to form alumina hydrogel. The pH of each reaction mixture during the hydrogel forming stage was also shown in Table 3. The hydrogel was then processed in the same manner as described in Example 1 whereby there were obtained seven types of alumina (Alumina Samples G-M) whose physical properties are shown in Table 4. For convenience of comparison, the data for Alumina Sample A (Example 1) are also shown in Tables 3 and 4.

TABLE 3

|  | Feed Rates (l/hr) | | | | | | | Example 1 |
|---|---|---|---|---|---|---|---|---|
|  | 1 | 2 | 3 | 4 | 5 | 6 | 7 |  |
| First solution | 0.07 | 0.58 | 2.9 | 1.16 | 0.29 | 2.20 | 0.07 | 0.29 |
| Second solution | 0.05 | 0.40 | 2.0 | 0.05 | 0.15 | 0.30 | 0.80 | 0.20 |
| pH | 9-10 | 9-10 | 8-11 | 4-10 | 8-10 | 10-11 | 10-12 | 9-10 |
| Alumina | G | H | I | J | K | L | M | A |

TABLE 4

|  | G | H | I | J | K | L | M | A |
|---|---|---|---|---|---|---|---|---|
| Specific surface area ($m^2/g$) | 198 | 222 | 173 | 154 | 233 | 217 | 178 | 234 |
| Pore volume (cc/g) | | | | | | | | |
| 75-100 Å | 0.41 | 0.11 | 0.05 | 0.07 | 0.07 | 0.07 | 0.35 | 0.07 |
| 100-200 Å | 0.03 | 0.59 | 0.23 | 0.43 | 0.70 | 0.40 | 0.02 | 0.28 |
| 200-400 Å | 0.01 | 0.02 | 0.33 | 0.01 | 0.06 | 0.45 | 0.01 | 0.63 |
| 400 Å - | 0 | 0.01 | 0.67 | 0.01 | 0.03 | 0.03 | 0.01 | 0.03 |
| Total | 0.45 | 0.73 | 1.29 | 0.52 | 0.85 | 0.96 | 0.38 | 1.01 |
| Average pore diameter (Å) | 90 | 132 | 299 | 135 | 145 | 177 | 86 | 180 |
| Pellet diameter (mm) | 1.0 | 1.1 | 1.3 | 1.1 | 1.2 | 1.4 | 0.9 | 1.1 |
| Side crushing strength (Kg) | 1.5 | 3.3 | 1.5 | 1.8 | 3.0 | 2.8 | 2.7 | 2.9 |

As seen from the data summarized in Tables 3 and 4, Alumina Sample G obtained with a very low feed rate of aluminum components (0.14 mol/hour in terms of elemental aluminum per mol of the aluminum hydroxide in the starting material slurry) has a very small pore volume and a low mechanical strength. On the other hand, Alumina Sample I obtained with a very high feed rate (5.7 mol/hour) has a large pore volume. However, Alumina Sample I is broad in pore distribution and is low in mechanical strength. The smallness in pore diameter and pore volume and the lowerness in mechanical strength of Alumina Samples J and M are attributed to improper pH control during the hydrogel forming stage. In contrast, Alumina Samples H, K, L and A prepared in accordance with the process of this invention have excellent physical properties suitable for use as catalyst carriers.

EXAMPLE 4

0.15 Liter of 11.6 wt % sulfuric acid and 10 liters of deionized water were placed in an enamel-coated vessel and heated to 90° C. Then, 0.4 liter of an aqueous solution of sodium aluminate (concentration: 69 g/l in terms of $Al_2O_3$) was poured into the vessel all at once, with vigorous agitation, to form an aluminum hydroxide-containing slurry having a pH of 10. Then 11.6 wt % sulfuric acid and an aqueous solution of sodium aluminate (concentration: 69 g/l in terms of $Al_2O_3$) were continuously fed to the reactor at constant rates of 0.13 l/hour and 0.27 l/hour, respectively from separate feed ports for mixing with the aluminum hydroxide in the reactor, which served as a seed, while maintaining the temperature at 80° C. During the addition of the solutions, the pH of the mixture in the reactor was found to be maintained within the range of 9.5-10. 0.3 Liter of the reaction mixture was sampled after 6 hours from the commencement of the feed of the two aqueous solutions. Another 0.3 liter of the reaction mixture was also sampled after 3 hours from the first sampling. Each sample, which contained alumina hydrogel, was processed in the same manner as described in Example 1 to obtain Alumina Sample N and O (Reaction time: 6 and 9 hours, respectively) whose physical properties are shown in Table 5.

EXAMPLE 5

0.25 Liter of an aqueous solution of aluminum sulfate (concentration: 80 g/l in terms of $Al_2O_3$) and 10 liters of deionized water were placed in an enamel-coated vessel and heated to 70° C. Then, 0.34 liter of 5N NaOH solution was poured into the vessel all at once, with vigorous agitation, to form an aluminum hydroxide-containing slurry having a pH of 10.5. Then an aqueous solution of aluminum sulfate (concentration: 80 g/l in terms of $Al_2O_3$ and 5N NaOH solution were continuously fed to the reactor for 3 hours at constant rates of 0.25 l/hour and 0.31 l/hour, respectively from separate feed ports for mixing with the aluminum hydroxide in the reactor, which served as a seed, while maintaining the temperature at 70° C. During the addition of the solutions, the pH of the mixture in the reactor was found to be maintained within the range of 9.5-10.5. The thus obtained alumina hydrogel was processed in the same manner as described in Example 1 to obtain Alumina Sample P whose physical properties are shown in Table 5.

EXAMPLE 6

0.05 Liter of an aqueous solution of aluminum sulfate (First Solution, Concentration: 80 g/l in terms of $Al_2O_3$) and 10 liters of deionized water were placed in an enamel-coated vessel and then, after being heated to 95° C., 0.45 liter of an aqueous solution of sodium aluminate (Second solution, Concentration: 69 g/l in terms of $Al_2O_3$) was poured into the vessel all at once, with vigorous agitation, to form an aluminum hydroxide-containing slurry having a pH of 11. After the reaction mixture was maintained at 95° C. for 1 hour with agitation, 0.05 liter of the first solution and 0.3 liter of the second solution were simultaneously added to the reaction mixture, whereby the pH of the mixture instantaneously became 10.5. After the reaction mixture was maintained at 95° C. for 1 hour with agitation. 0.05 liter of the first solution and 0.3 liter of the second solution were added to the mixture, so that the pH of the mixture became 11. After being aged at 95° C. for 3.5 hours with agitation, to the mixture there was hourly and thricely added the first and second solutions thereto in amount, in each time, of 0.06 and 0.28 liter, respectively, thereby obtaining alumina hydrogel. The hydrogel was processed in the same manner as described in Example 1 to obtain alumina Sample Q whose physical properties are shown in Table 5.

TABLE 5

| | N | O | P | Q |
|---|---|---|---|---|
| Specific surface area (m²/g) | 239 | 189 | 194 | 200 |
| Pore volume (cc/g) | | | | |
| 75–100 Å | 0.11 | 0.04 | 0.06 | 0.07 |
| 100–200 Å | 0.57 | 0.20 | 0.26 | 0.34 |
| 200–400 Å | 0.02 | 0.75 | 0.61 | 0.52 |
| 400 Å - | 0.02 | 0.14 | 0.07 | 0.03 |
| Total | 0.71 | 1.12 | 1.00 | 0.95 |
| Average pore diameter (Å) | 119 | 238 | 206 | 189 |
| Pellet diameter (mm) | 1.1 | 1.4 | 1.2 | 1.2 |
| Side crushing strength (Kg) | 3.5 | 2.7 | 3.0 | 2.3 |

We claim:

1. In a process for the preparation of alumina, including forming an alumina hydrogel from aluminum hydroxide, and processing the alumina hydrogel into alumina, the improvement comprising the alumina hydrogel forming step which is conducted in the presence of sulfate ion and which comprises feeding an aluminum compound and a pH controlling agent to a reaction zone, in which an aqueous slurry containing seed aluminum hydroxide is contained, for mixing with said aqueous slurry while maintaining said aqueous slurry at a temperature of at least about 50° C. at feed rates so that the pH of said aqueous slurry is maintained within the range of 6–11 and that 0.2–5 mols/hour of aluminum components, in terms of elemental aluminum, are fed to said reaction zone per mole of the seed aluminum hydroxide originally contained in said aqueous slurry, whereby the seed aluminum hydroxide is caused to grow to the alumina hydrogel.

2. A process according to claim 1, wherein said feeding of the aluminum compound and the pH controlling agent is conducted continuously and simultaneously.

3. A process according to claim 1, wherein said aqueous slurry contained in said reaction zone contains the sulfate ion.

4. A process according to claim 1, wherein at least one of the aluminum compound and the pH controlling agent is capable of generating the sulfate ion.

5. A process according to claim 1, wherein the aluminum compound and the pH controlling agent are each fed to said reaction zone in the form of an aqueous solution, at least one of the aqueous solutions of aluminum compound and of the pH controlling agent contains the sulfate ion.

6. A process according to claim 1, wherein the aluminum compound is aluminum sulfate and the pH controlling agent is selected from the group consisting of sodium aluminate, sodium hydroxide, potassium hydroxide and ammonia.

7. A process according to claim 6, wherein the pH controlling agent is sodium aluminate.

8. A process according to claim 6, wherein the pH controlling agent is sodium hydroxide.

9. A process according to claim 1, wherein the aluminum compound is an aluminate and the pH controlling agent is sulfuric acid.

10. A process according to claim 9, wherein the aluminum compound is sodium aluminate.

* * * * *